United States Patent
Joshi

(10) Patent No.: US 10,235,413 B2
(45) Date of Patent: Mar. 19, 2019

(54) RETRIEVING CONTEXT FROM PREVIOUS SESSIONS

(71) Applicant: Google LLC, Mountain View, CA (US)

(72) Inventor: Ajay Joshi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 221 days.

(21) Appl. No.: 14/448,547

(22) Filed: Jul. 31, 2014

(65) Prior Publication Data

US 2015/0356136 A1 Dec. 10, 2015

Related U.S. Application Data

(60) Provisional application No. 62/010,294, filed on Jun. 10, 2014.

(51) Int. Cl.
*G06F 17/30* (2006.01)
*G06F 7/00* (2006.01)

(52) U.S. Cl.
CPC .... *G06F 17/30424* (2013.01); *G06F 17/3087* (2013.01); *G06F 17/30241* (2013.01)

(58) Field of Classification Search
CPC ........................ G06F 17/30424; G06F 17/3087
USPC .......................................................... 707/736
See application file for complete search history.

(56) References Cited

U.S. PATENT DOCUMENTS

| | | | |
|---|---|---|---|
| 6,980,984 B1 * | 12/2005 | Huffman | G06F 17/30657 707/999.003 |
| 7,054,420 B2 | 5/2006 | Barker et al. | |
| 8,015,005 B2 | 9/2011 | Ma | |
| 8,112,275 B2 | 2/2012 | Kennewick et al. | |
| 8,150,872 B2 | 4/2012 | Bernard | |
| 8,538,973 B1 * | 9/2013 | Gonzalez | G06F 17/3087 707/758 |
| 8,577,671 B1 | 11/2013 | Barve et al. | |

(Continued)

OTHER PUBLICATIONS

Sullivan, "Google's Impressive "Conversational Search" Goes Live on Chrome," May 22, 2013, Retrieved from the Internet: URL:http:// searchengineland.com/googles-impressive-conversational-search-goes-live-on-chrome-16t:1445, [retrieved on Oct. 13, 2015], 20 pages.

(Continued)

*Primary Examiner* — Pavan Mamillapalli
(74) *Attorney, Agent, or Firm* — Fish & Richardson P.C.

(57) ABSTRACT

Methods, systems, and apparatus, including computer programs encoded on a computer storage medium, for retrieving and using contextual data from previous conversation sessions in conversational searches. In one aspect, a method includes receiving a first query for a first user session, determining that the first query refers to one or more tags in a first repository, the first repository associating respective identifiers to respective tags, each identifier representing a corresponding user session, determining one or more particular identifiers associated with the one or more tags in the first repository, retrieving particular contextual data associated with the determined particular identifiers in a second repository, the second repository associating respective identifiers to respective contextual data associated with corresponding user sessions represented by the respective identifiers, and performing an action responsive to the first query based on the retrieved particular contextual data.

28 Claims, 6 Drawing Sheets

(56) References Cited

U.S. PATENT DOCUMENTS

| | | | |
|---|---|---|---|
| 8,995,716 B1* | 3/2015 | Zomet | G06K 9/00664 |
| | | | 382/103 |
| 9,194,716 B1* | 11/2015 | Cutter | G01C 21/3679 |
| 9,576,573 B2* | 2/2017 | Bodell | G10L 15/22 |
| 9,747,390 B2* | 8/2017 | Cooper | G06F 17/30672 |
| 9,875,494 B2* | 1/2018 | Kalns | G06Q 30/06 |
| 2003/0081744 A1* | 5/2003 | Gurfein | H04M 3/493 |
| | | | 379/93.13 |
| 2006/0101005 A1* | 5/2006 | Yang | G06F 17/3087 |
| | | | 707/999.003 |
| 2006/0167896 A1* | 7/2006 | Kapur | G06F 17/30867 |
| | | | 707/999.01 |
| 2007/0192085 A1* | 8/2007 | Roulland | G06F 17/30654 |
| | | | 704/9 |
| 2009/0055355 A1 | 2/2009 | Brunner et al. | |
| 2011/0040768 A1 | 2/2011 | Shon et al. | |
| 2011/0225192 A1* | 9/2011 | Imig | G06F 17/30646 |
| | | | 707/775 |
| 2011/0264656 A1* | 10/2011 | Dumais | G06F 17/3087 |
| | | | 707/728 |
| 2011/0270819 A1 | 11/2011 | Shen et al. | |
| 2012/0166468 A1* | 6/2012 | Gupta | G06F 17/3087 |
| | | | 707/768 |
| 2012/0265528 A1* | 10/2012 | Gruber | G10L 15/18 |
| | | | 704/235 |
| 2013/0283168 A1* | 10/2013 | Brown | G06F 17/3087 |
| | | | 715/728 |
| 2014/0095596 A1* | 4/2014 | Singh | H04M 3/42059 |
| | | | 709/204 |
| 2015/0112963 A1* | 4/2015 | Mojtahedi | G06F 17/3087 |
| | | | 707/711 |

OTHER PUBLICATIONS

Extended European Search Report issued in European Application No. 15169051.8 dated Nov. 3, 2015, 8 pages.

EP Office Action issued in European Application No. 15169051.8, dated Jan. 4, 2019, 6 pages.

* cited by examiner

RETRIEVING CONTEXT FROM PREVIOUS SESSIONS

CROSS-REFERENCE TO RELATED APPLICATIONS

This application claims priority to U.S. Provisional Application Ser. No. 62/010,294, filed Jun. 10, 2014, the entire contents of which are hereby incorporated by reference.

BACKGROUND

This specification relates to natural language processing.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries can be, for example, in the form of text, audio, or video. The search system selects and scores resources, e.g., based on their relevance to the search query and on their importance relative to other resources to provide search results. The search results are typically ordered according to the scores and presented according to this order.

SUMMARY

This specification describes retrieving and using contextual data from previous sessions in a conversational search by determining that a query refers to one or more tags in an index repository, determining one or more particular session identifiers associated with the tags in the index repository, retrieving particular contextual data associated with the particular session identifiers in a data repository, and performing an action responsive to the query based on the retrieved particular contextual data.

In general, one innovative aspect of the subject matter described in this specification can be embodied in methods that include the actions of receiving a first query for a first user session; determining that the first query refers to one or more tags in a first repository, the first repository associating respective identifiers to respective tags, each identifier representing a corresponding user session; determining one or more particular identifiers associated with the one or more tags in the first repository; retrieving particular contextual data associated with the determined particular identifiers in a second repository, the second repository associating respective identifiers to respective contextual data associated with corresponding user sessions represented by the respective identifiers; and performing an action responsive to the first query based on the retrieved particular contextual data.

In another general embodiment, a method may include the actions of receiving a query for a user session; determining, by the one or more computers, that the query refers to a time indicator, the time indicator indicating a time earlier than the user session; determining, by the one or more computers, that the query refers to one or more item labels in an index repository, the index repository associating respective user sessions to respective time labels for the user sessions and respective item labels for queries in the user sessions; determining, by the one or more computers, a plurality of candidate user sessions in the index repository, each candidate user session being associated with a respective time label corresponding to the time indicator; determining, by the one or more computers, one or more particular user sessions associated with the one or more item labels within the determined candidate user sessions; retrieving, by the one or more computers, particular contextual data associated with the determined particular user sessions in a data repository, the data repository associating respective user sessions to respective contextual data for the user sessions; and performing, by the one or more computers, an action responsive to the query based on the retrieved particular contextual data.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. For instance, the conversational search system may determine, for each tag of the tags, a plurality of respective candidate identifiers associated with the tag in the first repository and select the particular identifiers from the determined respective candidate identifiers by determining an overlap of the determined respective candidate identifiers. Each identifier of the particular identifiers may be associated with each tag of the tags in the first repository. In some cases, the one or more tags may include a time tag indicating a time earlier than the first user session. A conversational search system may determine a plurality of candidate identifiers associated with the time tag in the first repository, and select the one or more particular identifiers from the plurality of candidate identifiers based on remaining tags of the one or more tags.

In some examples, the one or more tags include at least one of a session tag or an item tag. The session tag may be associated with information about particular corresponding user sessions for the particular identifiers. The item tag may be associated with at least one of particular queries in the particular corresponding user sessions or particular search results responsive to the particular queries. The conversational search system may determine that at least one of the particular queries or the particular search results refers to a particular item corresponding to the item tag and perform the action responsive to the first query based on the determined particular item. In some cases, before determining that the first query refers to one or more tags in a first repository, the conversational search system may determine that the first query lacks additional information required for performing the action and that the first query is not associated with a previous query for the first user session.

In some implementations, the conversational search system receives a second query for a second user session from a user and determines that at least one of the second query or a second search result responsive to the second query refers to a second item in a database. The database associates respective items to respective item tags. The conversational search system may determine one or more second item tags associated with the second item in the database, store the second item tags in the first repository, and associate the second item tags with a second identifier representing the second user session in the first repository. In some cases, the conversational search system determines one or more second session tags for the second user session. The second session tags may include at least one of a timestamp for the second user session, a location of the user for the second user session, or an action associated with the user before the second user session. The conversational search system may store the second session tags in the first repository and associate the second session tags with the second identifier in the first repository. In some cases, the conversational search system determines second contextual data for the second query. The second contextual data may include the second query, the second search result, and metadata associated with the second query and the second search result. The conversational search system may store the second contextual data in the second repository and associate the second contextual data with the second identifier in the second repository.

Particular embodiments of the subject matter described in this specification can be implemented so as to realize one or more of the following advantages. First, a conversational search system can make conversational search smarter and more natural by quickly and seamlessly retrieving and using contextual data from previous conversational searches into current conversational search. This can enhance the user experience. For example, the conversational search system allows partial task completion and starts out from where a user left off previously. Second, the conversational search system can determine relevant previous searches based on little, limited, or partial information that the user remembers, which minimizes user input and helps the user in the searches. Third, the conversational search system can efficiently provide quick responses, e.g., by associating short conversation sessions with session labels (e.g., time labels, user location labels, user action labels, and/or co-presence information labels) and/or item labels in an index repository and searching relevant conversation sessions in the index repository based on query segments corresponding to the labels, instead of searching all the previous queries and answers, which may result in a huge number of spurious matches when retrieving. By searching relevant conversation sessions instead of searching all the previous search queries and answers, the conversational search system (i) uses less processing resources because, e.g., the processor is executing a search query against fewer index entries, (ii) uses less memory resources because, e.g., the execution of the search query identified fewer search results and fewer identified search results are stored in memory, (iii) uses less bandwidth because, e.g., fewer search results are being passed between back-end servers, provided to the user device, or the like, and (iv) uses less power consumption because, e.g., the conversaional search system is using less processing resources, dissipating less heat because of lower processing resource usage, reducing the amount of resources required to cool the one or more processors, or a combination thereof. For example, the index repository may be keyed by a user location when the user was doing the query, which can be later used, e.g., "what restaurant was I talking about this morning when I was in San Francisco?" The index repository may be keyed by entity annotations, e.g., "what book was I talking about this morning?" The user might have been using a book title without ever mentioning the word "book" in a previous query and the conversational search system may determine the word "book" based on entity annotations. The index repository may be also keyed by attributes of entities (e.g., addresses for restaurants) and other metadata for entities (e.g., customer ratings for restaurants). Fourth, the conversational search system can achieve high accuracy and reliability, e.g., by determining item labels for items such as entities based on an annotation database that stores millions of items and associated item labels. Fifth, the conversational search system can be extensible to any suitable language besides English.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
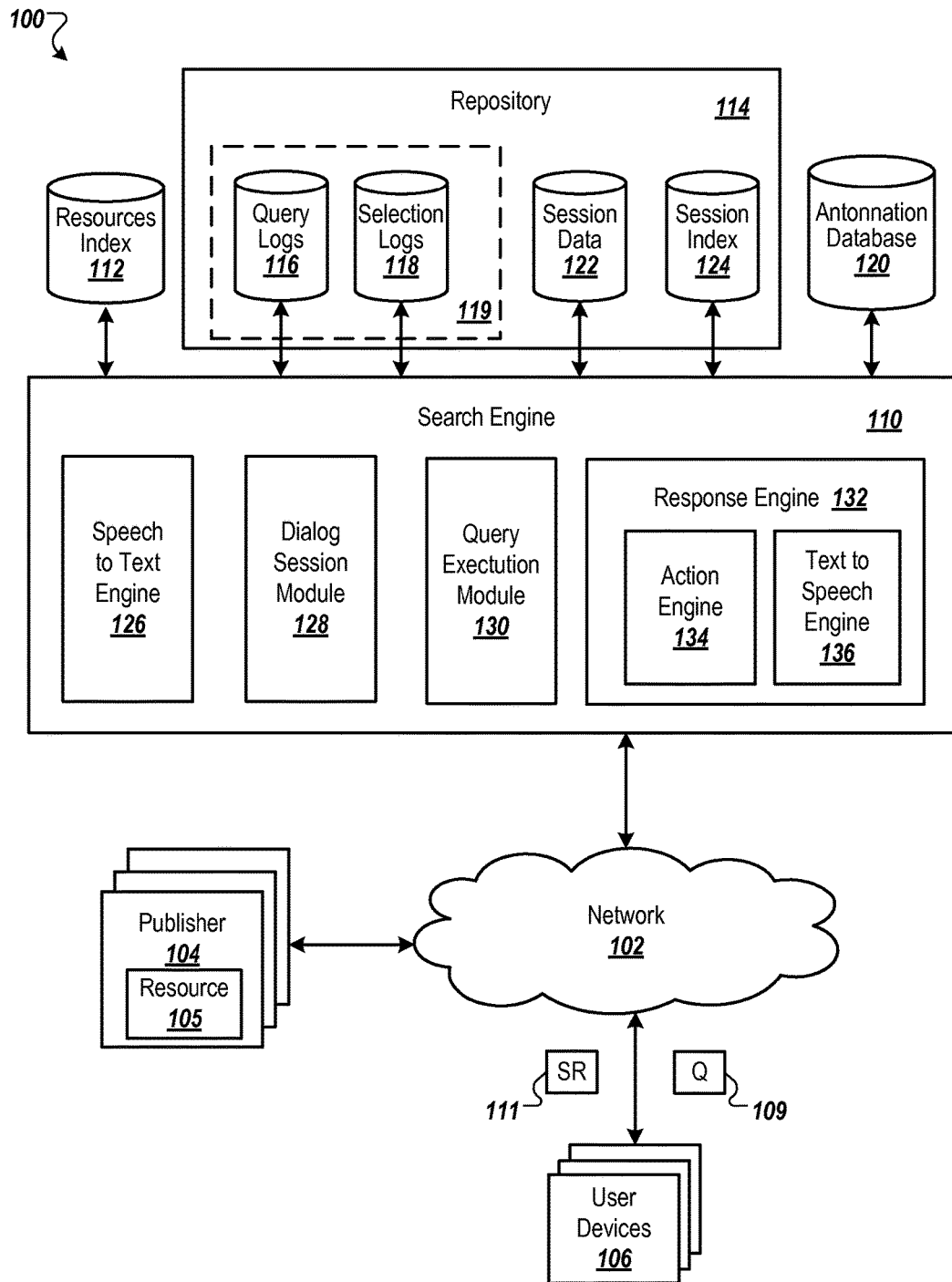
FIG. 1A is block diagram of an environment in which a search engine retrieves and uses contextual data from previous sessions in conversational searches.

FIG. 1A is a block diagram of an example environment 100 in which a search engine 110 provides conversation search services. The search engine 110 enables retrieving and using contextual data associated with previous user sessions in conversational searches. The search engine 110 stores and indexes previous user sessions with associated tags in an index repository. When receiving a query in a new conversational search, the search engine 110 determines that the query refers to one or more tags, e.g., a time tag, in the index repository and then determines one or more previous sessions indexed with the tags. The search engine 110 then retrieves contextual data associated with the determined previous sessions, e.g., in a data repository, and performs an action responsive to the query based on the retrieved contextual data.

A computer network 102, such as a local area network (LAN), wide area network (WAN), the Internet, or a combination thereof, connects publisher websites 104, user devices 106, and a search engine 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each publisher website 104 is maintained by a content publisher, which is an entity that controls, manages and/or owns the publisher website 104.

A resource is any data that can be provided by a publisher website 104 over the network 102 and that has a resource address, e.g., a uniform resource locator (URL). The resources 105 may be HTML pages, electronic documents, images files, video files, audio files, and feed sources, to name just a few. The resources may include embedded information, e.g., meta information and hyperlinks, and/or embedded instructions, e.g., client-side scripts.

An example user device 106 may be capable of requesting and receiving resources over the network 102. Example user devices 106 may include personal computers, mobile communication devices, smart phones, tablets, TVs, set-top boxes (STBs), multimodal devices such as wearable computing devices, e.g., Google Glass, hybrid gesture recognition/speech recognition systems, e.g., Xbox/Kinect, automobile information systems, generic home entertainment systems, and other devices that can send and receive data over the network 102. A user device 106 typically includes a user application, e.g., a web browser, to facilitate the sending and receiving of data over the network 102. The web browser can enable a user to display and interact with text, images, videos, audio, music and other information typically located on a web page at a website on the World Wide Web or a local area network. The user device 106 may include a microphone that enables a user to record a voice query or audible input a voice query, and/or a speaker for playing out a speech.

To facilitate searching of these resources 105, the search engine 110 identifies the resources by crawling the publisher websites 104 and indexing the resources 105 provided by the publisher websites 104. The resources 105 are indexed and the index data are stored in a resource index 112.

The user devices 106 submit search queries 109 to the search engine 110. The search queries 109 may be in a form of a text query, a voice query, e.g., through a microphone in the user devices 106, a picture query, a video query, or the like. The search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the resource index 112 to identify resources that are relevant to the queries. The search engine 110 identifies the resources in the form of search results and returns the search results to the user devices 106 in a search results page resource 111. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The search engine 110 includes a repository 114. The search queries 109 and the search results responsive to the search queries 109, e.g., the web pages referenced by the search results, can be stored in the repository 114. The repository 114 can include metadata associated with the search queries 109 and/or the search results for the search queries 109.

The user devices 106 can receive the search results page resource 111 and render the pages for presentation to users. In response to the user selecting a search result at a user device 106, the user device 106 requests the resource 105 identified by the resource locator included in the selected search result. The publisher of the publisher website 104 hosting the resource 105 receives the request for the resource from the user device 106 and provides the resource 105 to the requesting user device 106.

The search queries 109 submitted from the user devices 106 can be stored in query logs 116 in the repository 114. Selection data for the queries and the web pages referenced by the search results and selected by users are stored in selection logs 118 in the repository 114. The query logs 116 and the selection logs 118 define search history data 119 that includes data from and related to previous search requests associated with unique identifiers.

The selection logs 118 represent actions taken responsive to search results provided by the search engine 110. The query logs 116 and selection logs 118 can be used to map queries submitted by user devices to resources that were identified in search results and the actions taken by users when presented with the search results in response to the queries.

In some implementations, data is associated with the identifiers from the search requests so that a search history for each identifier can be accessed. The selection logs 118 and query logs 116 can thus be used by the search engine 110 to determine the respective sequences of queries submitted by the user devices 106, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The search engine 110 includes a session data repository 122 in the repository 114 for storing contextual data of user sessions. Each user session may include one or more queries. The contextual data for each session may include the one or more queries, one or more search results responsive to the queries, and metadata associated with the queries and the search results. A user session may be associated with other user sessions in the session data repository 122. For example, the user sessions may refer to a same topic or same entity.

Each user session can be assigned a unique identifier (ID) representing the user session, e.g., a number identifier, a letter identifier, a combination thereof, or the like. The search engine 110 associates respective identifiers with respective contextual data of user sessions that are represented by the identifiers in the session data 122. Therefore, the search engine 110 can retrieve particular contextual data of a particular user session by determining a particular identifier for the particular user session and using the particular identifier to find the particular contextual data in the session data 122.

In some implementations, a user session is defined using a time interval, e.g., 30 seconds, 60 seconds, or 120 seconds, for sequential search queries. The search engine 110 determines whether the sequential search queries are received within the time interval and determines whether the sequential search queries are associated with each other. A length of a user session may depend on a period of time for receiving associated sequential queries in the user session. Suppose that the specific period of time is 60 seconds. In that case, a user session may have a longer time length, e.g., 5 minutes, or a shorter time length, e.g., 40 seconds.

In some examples, the search engine 100 determines whether a query is associated with a previous query by determining whether the query is an incomplete query that lacks additional information required for performing an action responsive to the query and/or determining whether the additional information can be obtained from contextual data associated with the previous query. If the search engine 100 determines that the query is an incomplete query and/or that the contextual data for the previous query provides the additional information, the search engine determines that the query is associated with the previous query.

In some examples, the search engine 100 determines whether a query is associated with a previous query by determining whether the query or a search result responsive to the query includes an explicit or implicit reference to the previous query. In a particular example, if the previous query refers to an entity and the query includes a corresponding pronoun for the entity, the search engine 100 determines that the query is associated with the previous query. In another particular example, the search engine 100 determines that the query is associated with the previous query if the query has the same intent as the previous query, e.g., using a template as described further below.

In some cases, if a query is received within the time interval after receiving a previous query and determined to be associated with the previous query, the query is determined in the same user session as the previous query. If a query is received within the time interval but determined not to be associated with the previous query, the query is determined not in the same user session as the previous query. If a query is not received within the time interval following a previous query, the query is determined not in the same user session as the previous query. Upon determining that the query is not in the same user session as the previous query, the search engine 110 may determine that the user session for the previous query ends and associate the query with a new user session.

In some implementations, a user session is defined as a series of search queries from a same user device or a same device identifier within a specific period of time, e.g., 1 minute, 2 minutes, or 5 minutes, after the user session starts, e.g., when receiving a first query of the queries. The search engine 110 can determine whether the series of search queries are associated with each other.

In some cases, if a second query of the queries is associated with the first query or a previous query in the user session, the search engine 110 determines that the second query is associated with the user session. If the second query of the queries is not associated with the first query or the previous query, the search engine 110 determines that the second query is not associated with the user session. In some cases, the user session may include one or more sub-sessions. Each sub-session may be assigned a unique identifier. Queries within a sub-session are associated with each other. The queries in the same sub-session may be sequential or not sequential. Queries in a sub-session may be not associated with queries in another sub-session.

In some implementations, the search engine 110 includes an annotation database 120 in the repository 114. The annotation database 120 stores information about a number of items, e.g., entities, events, or actions. The number of items may be stored in the annotation database 120 under different categories or collections, e.g., collections/person, collections/business, collections/flight, collections/game, or collections/action. In some implementations, the annotation database 120 is hosted in a server external to the search engine 110. The search engine 110 may communicate with the annotation database 120 via the network 102 or any appropriate data communications channel.

The annotation database 120 associates each item with one or more item tags, labels or annotations. The item tags may be associated with attributes or properties of the item. For example, if an item refers to a person, e.g., "Lady Gaga," the item tags associated with the person may include a profession tag, e.g., "musical artist," "composer," and/or "popular singer," a nationality tag, e.g., "U.S.," or a gender tag, "female." If an item refers to a book, e.g., "rich dad poor dad," the item tags associated with the book may include a category tag, e.g., "book," an author tag, e.g., "Robert T. Kiyosaki," or a publisher tag, e.g., "Plata Publishing." If an item refers to a restaurant, e.g., "Gary Danko," the item tags associated with the restaurant may include a category tag, "restaurant," a street tag, e.g., "Point Street," a city tag, e.g., "San Francisco," or a cuisine type tag, e.g., "French."

Two items may have same values for a first item tag but different values for a second, different item tag. For example, an item refers to a restaurant "Zuni Café." The item "Zuni Café" has a category tag "restaurant" same as the item "Gary Danko," but a street tag "market street" different from the street tag "point street" for the item "Gary Danko."

After receiving a search query 109 for a user session from a user device 106, the search engine 110 may determine that the search query 109 refers to an item and search the item in the annotation database 120. In some cases, the search engine 110 determines that the item is found within the annotation database 120. The search engine 100 may determine one or more item tags associated with the item and associate the determined item tags with the search query 109 and/or the user session, e.g., in the repository 114.

In some cases, the search engine 110 determines that the item the search query 109 refers to is not found within the annotation database 120. The search engine 110 may search information about the item, e.g., in the network 102, and determine one or more item tags for the item. The item tags can be determined based on criteria of the annotation database 120 that define item tags for the item. For example, the criteria for a term "book" may define corresponding item tags to be a category tag, an author tag, a publisher tag, or the like. The search engine 110 may then determine values for the corresponding item tags for the item. The search engine 110 may submit the item and the determined item tags to update the annotation database 120, e.g., automatically or after accuracy verification. In some cases, the annotation database 120 is manually updated, e.g., by a system administrator, with items and associated item tags.

In some implementations, the search engine 110 includes a session index repository 124 in the repository 114. The session index repository 124 associates respective identifiers for user sessions with respective item tags and/or items for the user sessions, that is, the session index repository 124 maps items tags to identifiers for user sessions. An item tag and/or an item may be associated or mapped to one or more identifiers. An identifier may be associated with or mapped to one or more item tags or items. Based on the association or mapping in the session index repository 124, the search engine 110 may determine one or more particular identifiers based on one or more particular item tags and/or particular items.

In some examples, after receiving a search query 109 for a user session from a user device 106, the search engine 110 may determine that the search query 109 or a search result responsive to the search query 109 refers to an item, e.g., by parsing the search query 109 based on grammar rules and/or the annotation database 120.

In some cases, a search result responsive to a query corresponds to a reply responsive to the query or an answer to the query. For example, suppose that the search query 109 is "which restaurant is the best French restaurant in San Francisco," and the search engine 110 determines that the search result is "Gary Danko." The search engine 110 may determine that the search result refers to an item "Gary Danko."

After determining the item, the search engine 110 may further determine whether the item is within the annotation database 120. As a consequence of determining that the item is within the annotation database 120, the search engine 110 determines one or more item tags associated with the item in the annotation database 120. For example, suppose that the item is "Gary Danko," as noted above, and the item tags associated with "Gary Danko" include a category tag of "restaurant," a street tag of "Point Street," a city tag of "San Francisco," and a cuisine type tag of "French." The search engine 110 may store the determined item tags and/or the item in the session index repository 124 and associate the item tags and/or the item with a unique identifier for the user session in the session index repository 124.

In some implementations, the search engine 110 determines one or more session tags for the user session that includes the search query 109. The session tags are associated with information about the user session.

In some examples, the session tags include a time tag, e.g., a timestamp, indicating when the user session starts and ends. For example, the user session starts at 8:30 am on Jul. 1, 2013, and ends at 8:35 am on Jul. 1, 2013. The time tag for the user session may be 8:30 am to 8:35 am on Jul. 1, 2013. The search engine 110 may map exact time to broader time references, e.g., "early morning," "morning," "noon," "afternoon," "evening," "night," or "midnight," and use the broader time references as the time tag. For example, suppose that the user session happens at 8:30 am, the time tag for the user session may be "early morning" or "morning." The time tag may include a data tag for the user session, e.g., "July 1, 2013."

In some examples, the session tags include a location tag indicating the location of a user when the user session occurs. The search engine 110 may determine the location of the user based on a locator, e.g., a global positioning system (GPS) in the user device 106 the user is using or an IP address of the user device 106. The location tag may be an exact address, e.g., "200 market street, San Francisco, Calif., 94111" or "market street". In some examples, the search engine 110 refers an exact address to a reference location based on information about the user or the user device. The location tag may include the reference location, e.g., "home," "my office," or "my wife's office."

In some examples, the session tags include an action tag indicating an action that the user is doing during the user session or an action that the user did before the user session. The search engine 110 may determine the action tag based on actions associated with previous user sessions or actions the user is doing with the user device 106. For example, the action tag may be "right after I called my wife," "right after I set the alarm," or "when I am doing my exercises."

In some examples, the session tags include a co-presence information tag that indicates whether the user is with someone else during the user session. For example, the co-presence information tag may be "with my wife."

After determining the one or more session tags for the user session, the search engine 110 may store the session tags in the session index repository 124 and associates the session tags with the unique identifier for the user session in the session index repository 124. In a later user session, based on the associations in the session index repository 124, the search engine may determine the identifier for the user session based on the one or more session tags, the one or more item tags and/or items.

For a user session, the session index repository 124 may associate an identifier for the user session with one or more session tags for the user session and one or more item tags and/or items associated with a series of queries in the user session.

As noted above, the search engine 110 can provide conversational search services to users. In some implementations, the search engine 110 includes a speech to text engine 126, e.g., an automated speech recognizer (ASR) or an automated speech recognition engine, a dialog session module 128, a query execution module 130, and a response engine 132. The response engine 132 may include an action engine 134 and a text-to-speech (TTS) engine 136.

The search engine 110 may receive a query, e.g., a voice query, a text query, or the like, from a user device 106 in a user session. The speech to text engine 126 may recognize a voice query and convert the voice query into a transcription. The speech to text engine 126 may correct or compensate errors in the voice query, e.g., based on spelling and/or grammar.

In some implementations, the search engine 110 provides the transcription of the voice query to the user device 106 for presentation to users. A user of the user device 106 may examine the presented transcription to check whether the search engine 110 understands the voice query correctly. The user can update the voice query if needed. The speech to text engine 126 can pass the transcription of the voice query to the dialog session module 128.

As noted above, the search engine 110, e.g., the dialog session module 128, can determine whether the query is associated with a previous query in a user session or a sub-session of a use session. In some examples, if the dialog session module 128 determines that the query is associated with the previous query, the query is determined to be associated with the user session. Contextual data associated with the query can be stored and associated with an identifier for the user session in the session data repository 122.

The search engine 110, e.g., the query execution module 130, may determine that the query or a search result responsive to the query refers to an item. In response to determining the item, the query execution module 130 may determine one or more item tags associated with the item, e.g., by searching the item in the annotation database 120. After determining the item tags, the search engine 110 may store and associate the item tags and/or the item with the identifier for the user session in the session index repository 124.

In some examples, the dialog session module 128 determines that the query is not associated with the previous query in the user session, e.g., by determining that the query is a complete query where the search engine 110 enables to perform an action responsive to the query without additional information. In response to determining that the query is not associated with the previous query, the dialog session module 128 determines that the query is not associated with the user session and associates the query with a new user session.

In some examples, if the dialog session module 128 determines that the query is an incomplete query and that the voice query is not associated with the previous query, the dialog session module 128 may determine that the query is related to previous user sessions. After determining that the query is related to previous user sessions, the search engine 110 may search the session data repository 122 and the session index repository 124 for additional information for the query.

In some examples, the dialog session module 128 determines that the query is related to previous user sessions by determining that the query has a past tense, e.g., "what was the book I talking about." In some examples, the dialog session module 128 determines that the query is related to previous user sessions by parsing the query, e.g., based on grammar rules, to determine that the query includes one or more session tags indicating an earlier time, e.g., a time tag of "this morning" or "yesterday morning," a location tag of "when I was at home," an action tag of "right after I called my wife," or a co-presence information tag of "when I was with my wife."

In some examples, the dialog session module 128 uses a number of templates based on grammar rules to determine item tags and/or session tags for a query and/or an intent of the query. For example, the templates may include:
What was [ITEM TAG] that I was talking about [TIME TAG]
  (e.g., the query is "what was the book that I was talking about this morning")
What was [ITEM TAG] on [ITEM TAG]
  (e.g., the query is "what was that place on castro street")
What did I talk about when I was at [LOCATION TAG]
  (e.g., the query is "what did I talk about when I was at home")

In response to determining that the query refers to the one or more tags, the search engine 110, e.g., the query execution module 130, may search the session index repository 124 to determine whether the one or more tags are associated with one or more particular identifiers in the session index repository 124. The one or more particular identifiers are associated with each tag of the one or more tags.

Figure 3A:
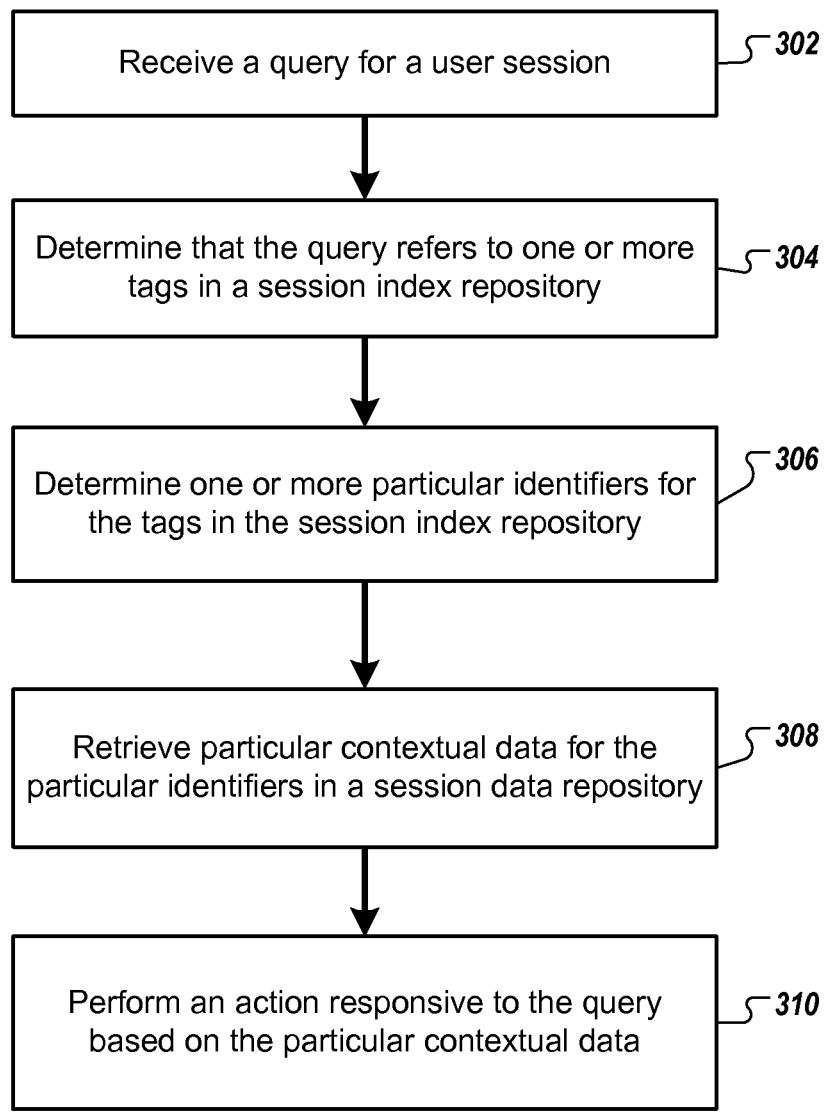
FIGS. 3A-3B are flow diagrams of an example process for retrieving and using contextual data from previous sessions in a conversation search.
Figure 3B:
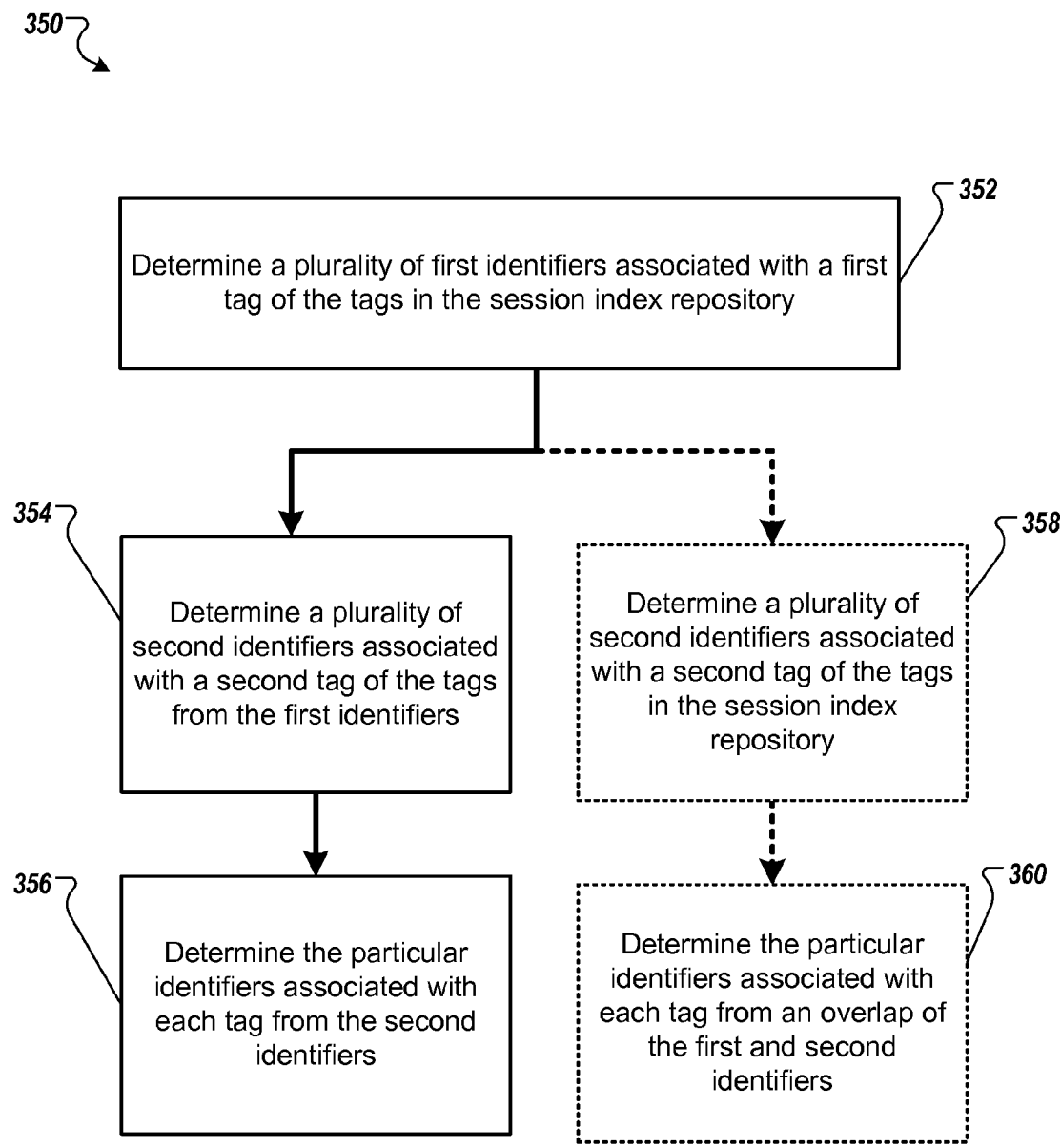

The search engine 110 may first determine a number of candidate identifiers associated with each tag in the session index repository 124 and select the one or more particular identifiers from the number of candidate identifiers by determining an overlap of the determined respective identifiers, as discussed in further details in FIG. 3B.

In response to determining that the tags are associated with the particular identifiers in the session index repository 124, the search engine 110, e.g., the query execution module 130, may search the session data repository 122 to determine particular contextual data associated with the particular identifiers.

The search engine 110, e.g., the response engine 132, may retrieve the particular contextual data from the session data 122 and perform an action in responsive to the query based on the retrieved particular contextual data, e.g., by the action engine 134. The action may include a search action, a reminder action, or a navigation action.

In some examples, the action engine 134 sets up one or more reminder notices and sends the reminder notices at predetermined time points to the user device 106. In some examples, the action engine 128 performs a navigation action and gives a direction from a departure location, e.g., a current address, to a destination location.

In some examples, the action engine 134 performs a search action responsive to the query and provides a search results webpage resource 111 to the user device 106. The search engine 110 may generate a reply based on the search results. The reply may be a summary or digest of the search results for replying the search query. The reply may be based on a search result that is most relevant to the search query and/or has a highest ranking score among the search results.

The text-to-speech engine 136 may convert the reply from a transcription into a speech. The user device 106 may receive a digital presentation of speech of the reply, so that a user can hear the reply through a speaker in the user device 106. In some cases, the user device 106 receives both the digital presentation of speech of the reply and the search results pages resource 111 presented on the user device 106.

In some implementations, the search engine 110 determines a user identifier for a user and/or a device identifier for a user device 106. The search engine 110 associates the user identifier and/or the device identifier with respective session data in the session data repository 122 and respective session indices in the session index repository 124. The session data and the session indices are associated with user sessions for the user or the user device 106. When the user inputs a query using the user device 106, the search engine 110 may determine the user identifier and/or the device identifier and then determine and use the associated session data in the session data repository 122 and/or the associated session indices in the session index repository 124.

In some implementations, the session data and/or the session indices associated with the user and/or the user device 106 may be stored in the user device 106. When the user inputs a query using the user device 106, the search engine 110 may request to access the stored session data and/or the session indices for a conversational search with the user and/or the user device 106. In some examples, the session data is stored in the user device 106. The session indices may be stored in the session index repositories 124 in the search engine 110. In a conversational search, the search engine 110 may determine one or more particular user sessions based on a search query and the session indices and request to access the session data in the user device 106.

In some implementations, the search engine 110 is configured to retrieve and use context from previous sessions in conversational searches for other international languages besides English, e.g., Chinese, Korean, Japanese, Russian, Hindi, French, or German. To achieve this, the search engine 110 may include a language code based map to support various language scenarios.

Figure 1B:
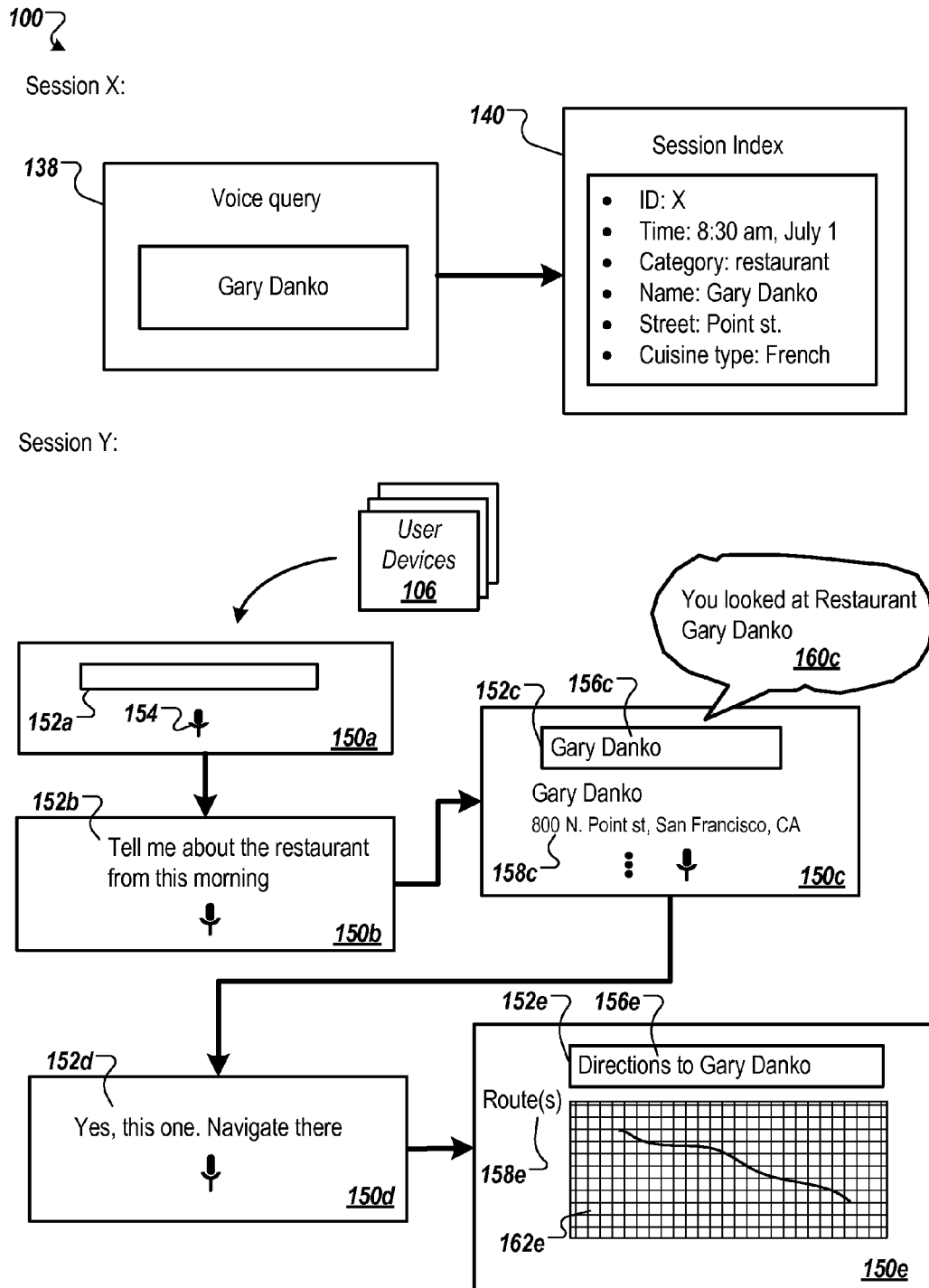
FIG. 1B is an illustration of a conversational search in an example search dialogue user interface.

FIG. 1B is an illustration of a conversational search in an example search dialogue user interface. The search engine 110 provides a search dialogue user interface 150a for displaying on a user device 106. The search dialogue user interface 150a includes a search box 152a for receiving a query and a microphone icon 154 for receiving a voice query from a user. The user inputs the voice query, e.g., by clicking the microphone icon 154 in the user interface 150a.

In user session X, the search engine 110 receives a voice query 138 from a user, e.g., "which restaurant is the best French restaurant in San Francisco." The search engine 110 determines that a search result responsive to the voice query refers to an item, e.g., "Gary Danko." The search engine 110 then determines that the item "Gary Danko" is within the annotation database 120, and determines one or more item tags associated with the item in the annotation database 120, including a category tag of "restaurant," a street tag of "Point Street," and a cuisine type tag of "French."

The search engine 110 stores the determined item tags and the item in the session index repository 124 and associate the item tags and the item with a unique identifier "X" for the user session in the session index repository 124 as a session index 140. The search engine 110 also determines one or more session tags for user session X, e.g., a time tag of "8:30 am, Jul. 1, 2013," and stores the time tag and associates the time tag with the identifier "X" in the session index 140 in the session index repository 124.

The search engine 110 determines contextual data associated with the voice query. The contextual data includes the search result responsive to the voice query, and metadata associated with the voice query and the search result. The metadata may include information about "Gary Danko" such as a customer rating, address, phone number, opening times, and menu, and/or other French restaurants in San Francisco. The search engine 110 stores the contextual data in the session data repository 122 and associates the contextual data with the identifier "X" for user session X in the session data repository 122.

In a later user session Y, e.g., at 6:00 pm, Jul. 1, 2013, the user inputs a new voice query. When the user starts to input the voice query, the user interface 150*a* changes to a user interface 150*b*. The voice query is recognized and converted into a transcription, e.g., by the speech-to-text engine 126. The transcription is transmitted, e.g., in real time or after completion of the voice query, to the user device 106 for displaying on the use interface 150*b*, e.g., a string 152*b* of "Tell me about the restaurant from this morning."

The search engine 110 determines that the transcription of the voice query refers to an item tag "restaurant" and a time tag "this morning." The search engine 110 determines that the voice query refers to an earlier time "this morning," e.g., 6:00 am to 12:00 pm on Jul. 1, 2013, based on grammar rules and a timestamp for user session Y.

The search engine 110 searches one or more particular identifiers associated with the item tag "restaurant" and the time tag "this morning" in the session index repository 124. The search engine 110 may determine a number of first candidate identifiers associated with the time tag "this morning," e.g., "M," "P," and "X," and a number of second candidate identifiers associated with the item tag "restaurant," e.g., "N" and "X." An overlap of the first and second candidate identifiers is "X." The search engine 110 then determines that the particular identifier associated with both the item tag and the time tag is "X" that corresponds to user session X.

In some examples, the search engine 110 first determines the first candidate identifiers associated with the time tag, e.g., "M," "P," and "X," and then determines the particular identifier from the determined first candidate identifiers, e.g., "X."

The search engine 110 may determine, based on the session index repository 124, a search result responsive to the voice query to be "Gary Danko," which is the item associated with the item tag "restaurant" and stored in the session index repository 124. The search engine 110 may retrieve the contextual data stored and associated with the identifier "X" in the session data repository 122 and determine that the item tag "restaurant" refers to "Gary Danko."

The search engine 110, e.g., the response engine 132, delivers the search result to the user device 106. The user interface 150*b* changes to a user interface 150*c* that includes a string 152*c* of "Gary Danko," e.g., the determined search result in a search box 152*c*. The user interface 150*c* also includes an ordered search result set 158*c* responsive to the string 152*c*. The search engine 110 generates a reply based on the search results and predetermined grammar rules or templates, e.g., "You looked at Restaurant Gary Danko." The user device 106 receives the text-to-speech 160*c* of the reply, which is played out by a speaker of the user device 106.

To continue the conversation, the user clicks the microphone icon 154 in the user interface 150*c*. When the user inputs a second voice query of "Yes, this one. Navigate there," the user interface 150*c* changes to a user interface 150*d*. The search engine 110 determines that the second voice query includes an explicit reference "there" referring to "Gary Danko" in the reply to the previous voice query, and performs, e.g., by the action engine 134, a navigation action responsive to the second voice query.

The user interface 150*d* changes to a user interface 150*e*. The search engine 110 may perform the navigation action and present a string 156*e* of "Directions to Gary Danko" in a search box 152*e*, navigation route(s) 158*e*, and a navigation map 162*e* in the user interface 150*e*.

Figure 2A:
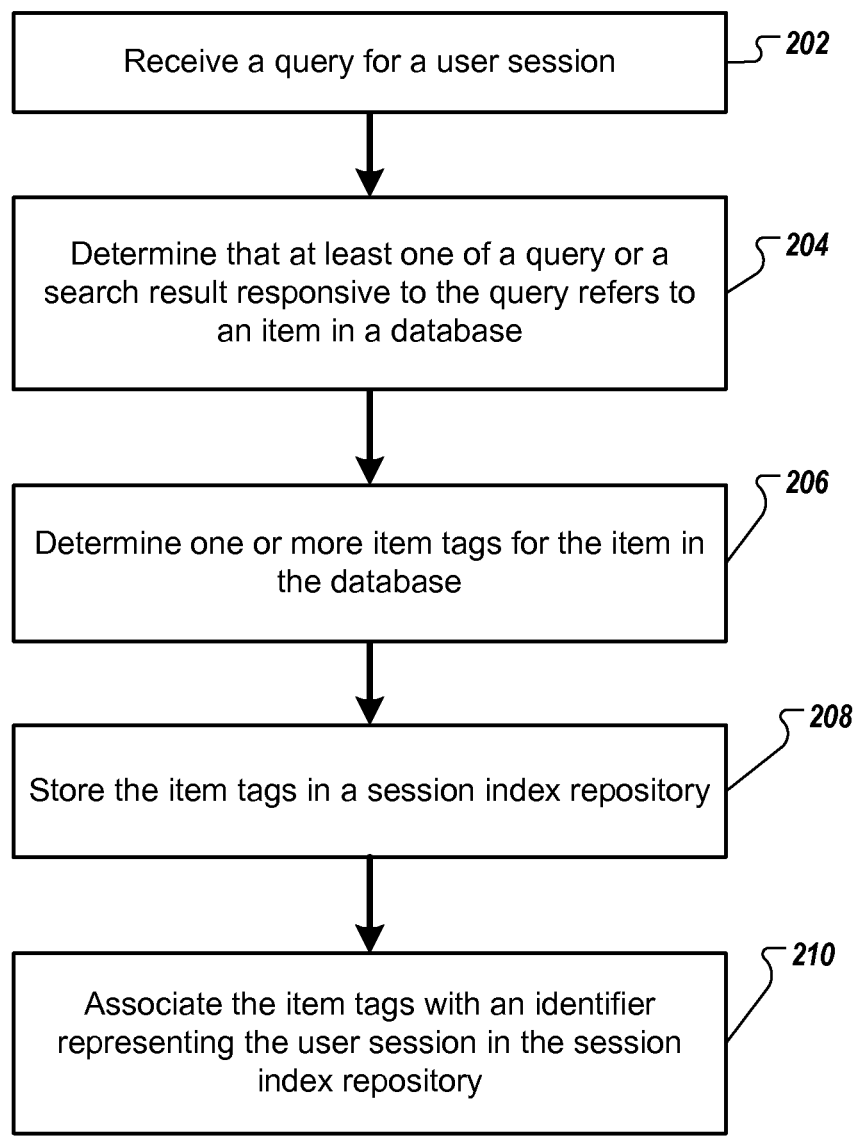
FIGS. 2A-2C are flow diagrams of an example process for storing and indexing item tags and contextual data of user sessions.
Figure 2B:
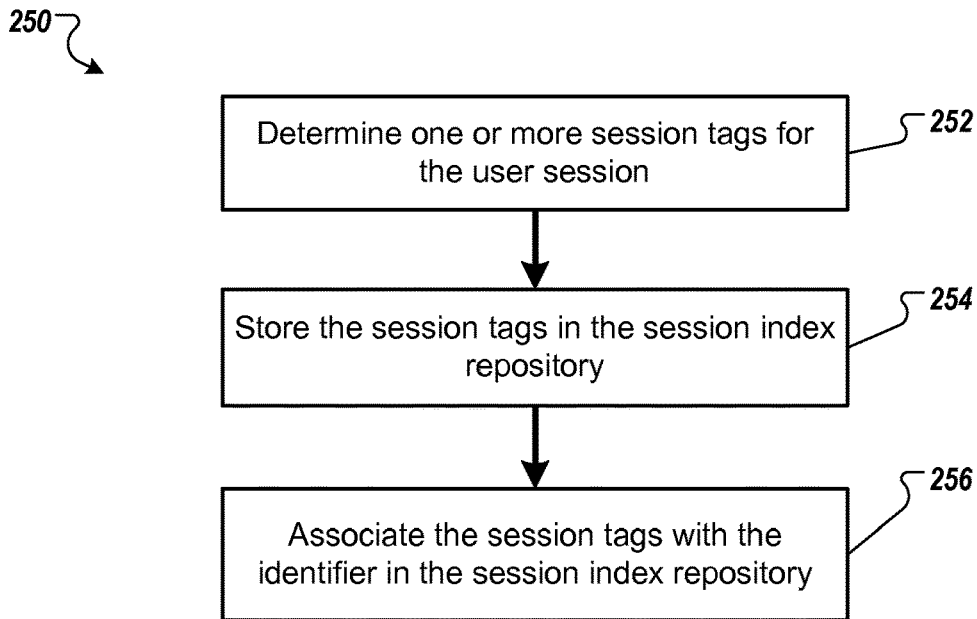
Figure 2C:
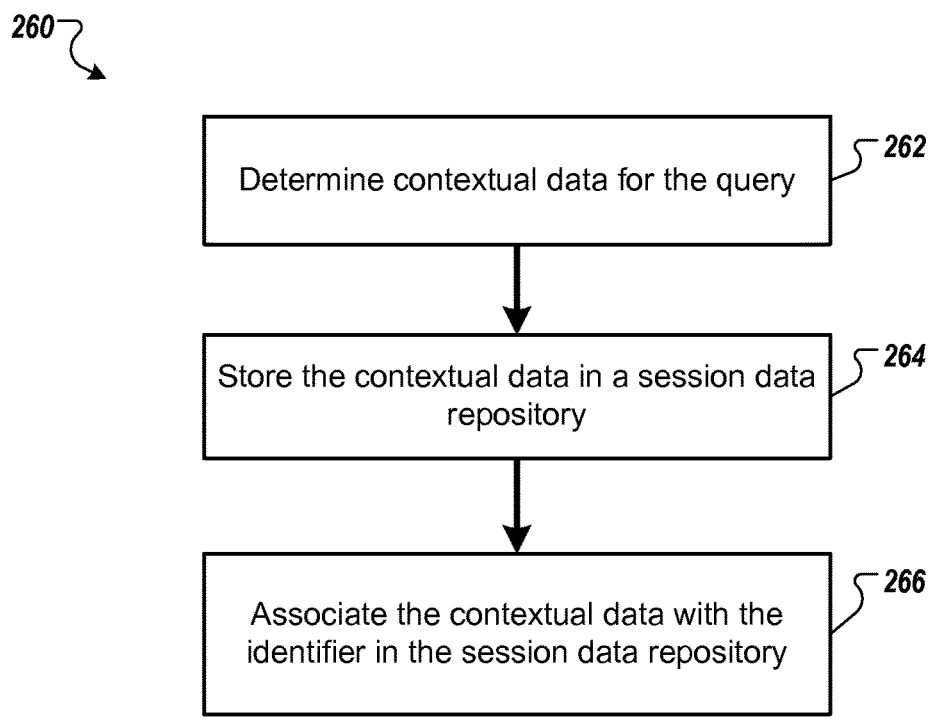

FIGS. 2A-2C are flow diagrams of an example process 200 for storing and indexing item tags and contextual data of user sessions. The process 200 can be performed by a search engine, e.g., the search engine 110 of FIGS. 1A-1B, to provide conversational search services to user devices, e.g., the user devices 106 of FIGS. 1A-1B.

The search engine receives a query for a user session (202). For example, the search engine receives the query from a user device during the user session. The search engine may determine that the query is associated with a previous query and associated with the same user session as the previous query. The search engine may determine that the query is not associated with the previous query and associate the query with a user session different from the user session for the previous query.

The search engine determines that at least one of a query or a search result responsive to the query refers to an item in a database (204). The search engine may parse the query or the search result to determine the query or the search result refers to the item, e.g., based on grammar rules or predetermined templates. The item may be an entity, an event, an action, or the like. The search engine may search the database, e.g., the annotation database 120 of FIG. 1A, to find the item. The database stores a number of items and associates each item with a number of item tags.

The search engine determines that one or more item tags for the item in the database (206). After determining that the item is within the database, the search engine determines the one or more item tags associated with the item in the database. For example, suppose that the item is "rich dad poor dad," the item tags associated with the book in the database may include a category tag, e.g., "book," an author tag, e.g., "Robert T. Kiyosaki," and a publisher tag, e.g., "Plata Publishing." In some cases, the query or the search result responsive to the query only includes "rich dad poor dad" without "book." The search engine can still determine the item "rich dad poor dad" is associated with a category tag "book" based on the database.

The search engine stores the item tags in a session index repository (208) and associates the item tags with an identifier representing the user session in the session index repository (210). The session index repository may be the session index repository 124 of FIGS. 1A-1B. The session index repository associates respective identifiers for user sessions with respective item tags and/or items and/or session tags. The search engine or the session index repository may assign the identifier for the user session, e.g., a number identifier, a letter identifier, a combination thereof, or the like. In some examples, the search engine also stores the item in the session index repository and associates the item with the identifier and the item tags in the session index repository.

FIG. 2B is a flow diagram of an example process 250 optionally performed by the search engine. The search engine determines one or more session tags for the user session (252). The session tags are associated with information about the user session. As noted above, the session tags may include a time tag, e.g., a timestamp, indicating when the user session starts and ends, a location tag indicating the location of a user when the user session occurs, an action tag indicating an action that the user is doing during the user session or an action that the user did before the user session, and/or a co-presence information tag that indicates whether the user is being with someone during the user session.

The search engine stores the session tags in the session index repository (250) and associates the session tags with the identifier for the user session in the session index repository (256). In some examples, the user session includes a series of queries. The identifier may be associated with item tags and/or items for each query in the user session and the session tags for the user session in the session index repository.

FIG. 2C is a flow diagram of an example process 260 optionally performed by the search engine. The search engine determines contextual data for the query (262). The search engine may determine the contextual data by searching in a network, e.g. the network 102 of FIG. 1A, and/or the database, e.g., the annotation database 120. The contextual data may include search results responsive to the query and metadata associated with the query and the search results. The metadata may include the determined item and item tags for the query.

The search engine stores the contextual data in a session data repository (264) and associates the contextual data with the identifier for the user session in the second repository (266). The session data repository may be the session data repository 122 of FIG. 1A. In some implementations, the session index repository and the session data repository are included in a same repository, e.g., the repository 114 of FIG. 1A. The user session may include a series of queries. The identifier may be associated with contextual data for each query in the user session in the session data repository.

FIGS. 3A-3B are flow diagrams of an example process 300 for retrieving and using contextual data from previous sessions in a conversation search. The process 300 can be used by a search engine, e.g., the search engine 110 of FIGS. 1A-1B or the search engine of FIGS. 2A-2C, to provide conversational search services to user devices, e.g., the user devices 106 of FIGS. 1A-1B.

The search engine receives a query for a user session (302). The query may be input by a user using a user device. The search engine may determine whether the query is associated with a previous query. If the search engine determines that the query is associated with the previous query, the search engine may perform an action responsive to the query based on contextual data associated with the previous query. If the search engine determines that the query is not associated with the previous query and the query is a complete query, the search engine may perform an action responsive to the query, independently from other queries.

In some examples, the search engine determines that the query is not associated with the previous query and the query is an incomplete query that lacks additional information to perform an action responsive to the query. In response to determining that the query is not associated with the previous query and is an incomplete query, the search engine may determine that the query is related to previous user sessions. In some cases, the search engine determines that the query is related to previous user sessions by determining that the query has a past tense or includes a time indicator referring to an earlier time.

The search engine determines that the query refers to one or more tags in a session index repository (304). The session index repository associates respective identifiers for user sessions with respective tags and/or items in the user sessions. The session index repository may be the session index repository 124 of FIGS. 1A-1B.

The search engine may parse the query to determine that the query refers to the one or more tags, e.g., based on grammar rules and/or predetermined templates. The search engine may also determine an intent of the query. In some examples, the search engine determines that the query includes one or more query segments by parsing the first query and determines the one or more tags in the session index repository by determining that the one or more tags correspond to the one or more query segments.

The one or more tags may include at least one or more item tags or one or more session tags. In some examples, the one or more tags include one or more item tags. For example, the query may be "what was the restaurant on castro street." The search engine determines that the query includes a category tag "restaurant" and an address tag or a street tag "castro street." The search engine may also determine that an intent of the user is looking for a restaurant on castro street, nearby, or in San Francisco.

In some examples, the one or more tags include one or more session tags. For example, suppose that the query is "what was I talking about when I was at home this morning." The search engine determines that the query includes two session tags: a location tag "home" and a time tag "this morning."

In some examples, the one or more tags include one or more session tags and one or more item tags. For example, the query may be "what restaurant was I looking this morning." The search engine determine that the query includes an item tag, that is, a category tag "restaurant," and a session tag, that is, the time tag "this morning."

After determining that the query refers to the one or more tags, the search engine may search the session index repository to determine whether the one or more tags are within the session index repository.

The search engine determines one or more particular identifiers for the tags in the session index repository (306). In responsive to determining that the one or more tags are within the session index repository, the search engine determines whether the one or more tags are associated with one or more particular identifiers in the session index repository. The particular identifiers may be associated with each tag of the tags.

FIG. 3B is a flow diagram of an example process 350 for determining the particular identifiers based on the tags in the session index repository. For purposes of illustration, in the process 350, the tags are assumed to include two tags. The search engine may use a process similar to the process 350 to determine the particular identifiers associated with more than two tags.

The search engine determines a plurality of first identifiers associated with a first tag of the tags in the session index repository (352). In some examples, the tags include a time tag, e.g., "this morning." The search engine may first determine the plurality of first identifiers associated with the time tag, e.g., by searching the session index repository to select the first identifiers associated with the time tag "this morning."

The search engine may determine that "this morning" is a relative time tag and then determine a time based on a timestamp for the user session in step 302. For example, suppose that the timestamp is "6:00 pm on Jul. 1, 2013." The search engine determines that "this morning" refers to "6:00 am to 12:00 pm on Jul. 1, 2013." The search engine then determines the plurality of first identifiers associated with time tags each referring to an absolute time within the time range "6:00 am to 12:00 pm on Jul. 1, 2013." The first identifiers may include identifier "0001" with a time tag "7:01 am," identifier "0005" with a time tag "8:00 am" identifier "0009" with a time tag "10:50 am" and identifier "0018" with a time tag "11:00 am." All the first identifiers have a date tag "Jul. 1, 2013."

The search engine determines a plurality of second identifiers associated with a second tag of the tags from the determined first identifiers (354). The second tag may be a session tag, e.g., a location tag "at home," or an item tag, e.g., a category tag "restaurant." Instead of searching within the session data repository, the search engine determines the second identifiers within the determined first identifiers. As the first identifiers are associated with the first tag, the determined second identifiers are associated with both the first tag and the second tag. For example, the determined second identifiers may include identifier "0001" and identifier "0018."

If the tags only include the first tag and the second tag, the search engine may determine that the second identifiers are the particular identifiers. In some examples, if the search engine determines that the second identifier only includes an identifier, e.g., identifier "0018," the search engine may also determine the second identifier is the particular identifier. If the tags include other tags besides the first and second tags, the search engine may continue to determine the particular identifiers associated with each tag from the second identifiers (356).

In some implementations, the search engine determines a plurality of second identifiers associated with a second tag of the tags in the session index repository (358). The search engine may perform step 352 and step 358, e.g., separately or/and concurrently. The search engine determines the particular identifiers associated with each tag from an overlap of the first and second identifiers (360).

In a particular example, suppose that the first identifiers associated with the first tag are "0001," "0005," "0009," and "0018." and the second identifiers associated with the second tag are "0001," "0018," and "0020." The overlap of the first and second identifiers includes identifier "0001" and identifier "0018." If the tags only include the first and second tags, the search engine determines that the particular identifiers are the overlapped identifier, that is, "0001" and "0018."

The search engine may separately determine a plurality of candidate identifiers associated with each tag of the tags in the session index repository. In some cases, the search engine determines the particular identifiers from an overlap of the candidate identifiers of each tag. In some cases, if the tags include a time tag, the search system first determines a plurality of candidate identifiers associated with the time tag, e.g., step 302, and then determines the particular identifiers from the determined candidate identifiers based on remaining tags, e.g., by determining identifiers associated with each of the remaining tags and selecting an overlap of the determined identifiers.

In some cases, the search engine determines an order for the candidate identifiers based on a number of associated tags, and determines the particular identifiers to be the identifier with the highest ordering score. For example, suppose that the tags include five tags. From the overlap of the candidate identifiers of the five tags, the search engine determines that a first candidate identifier is associated with three tags and a second candidate identifier is associated with four tags. There is no identifier associated with the five tags. Then the search engine may determine the particular identifier is the second candidate identifier.

Referring back to FIG. 3A, the search engine retrieves particular contextual data for the particular identifiers in a session data repository (308). After determining that the particular identifiers associated with the tags in the session index repository, the search engine determines and retrieves particular contextual data associated with the determined particular identifiers in the session data repository. The session data repository may be the session data repository 122 of FIG. 1A, and associates respective identifiers for user sessions to respective contextual data. The particular contextual data may include search queries in the user sessions that are represented by the particular queries, search results responsive to the search queries, and metadata associated with the search queries and the search results.

The search engine performs an action responsive to the query based on the particular contextual data (310). The search engine may use the retrieved particular contextual data to perform the action responsive to the query. The action may be a search action, a navigation action, a reminder action, or the like.

In some examples, the search engine determines that a search query or a search result in the retrieved contextual data refers to one or more particular items corresponding to the one or more tags that the query refers to. The search engine may perform the action responsive to the query based on the determined particular items.

For example, suppose that the query is "tell me about the restaurant from this morning." If the search query or the search result in the retrieved contextual data refers to an item "Gary Danko" corresponding to an item tag "restaurant" in the query, the search engine provides a reply responsive to the query, e.g., "You looked at Restaurant Gary Danko" based on the item "Gary Danko" and/or grammar rules and/or templates.

In a particular example, in an earlier user session X that occurred in the morning, a user was looking for restaurants in San Francisco for dinner. The search engine determined that at least one of queries in user session X or search results responsive to the queries refer to restaurants "Gary Danko," "Zuni Café," and "Slanted Door Restaurant."

The search engine determined a category tag "restaurant" and a city tag "San Francisco" for all the three restaurants in the database, e.g., the annotation database 120 of FIG. 1A. The search engine may also determine an address tag "Point Street" for "Gary Danko," "Market Street" for "Zuni Café," and "Ferry Building" for "Slanted Door Restaurant." The search engine stored and associated the determined tags for the restaurants with the session identifier X in the session index repository. The search engine also determined contextual data for the queries, e.g., restaurant names, addresses, open hours, phone numbers, cuisine types, and customer ratings. The search engine stored and associated the contextual data with the user session X in the session data repository.

In a later user session Y, e.g., in the evening on the same day as the user session X, the user is using the search engine for a conversational search. The search engine may retrieve and use the contextual data of the user session X to reply to the queries from the user. The queries (Q) and the answer or reply (A) may be as follows:
Q1: tell me about the restaurant from this morning
A1: You looked at restaurant Gary Danko
Q2: There was another one
A2: Yes Zuni Café on market street in San Francisco
Q3: Which was the one in Ferry Building
A3: That was the Slanted Door Restaurant
Q4: Yes that one, send that to my wife
Q5: Navigate there
In response to Q4, the search engine may transmit a message or an email to the user's wife. In response to Q5, the search engine may perform a navigation action to search a route directing from a current address of the user to the address of Slanted Door Restaurant.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a search engine and from a speech-to-text engine, a search query that is based on an utterance of a user that was detected by a digital assistant device during a current search session;
   determining, by the search engine, that the search query refers to a time indicator, the time indicator indicating a time earlier than the current search session;
   determining, by the search engine, that the search query refers to one or more other query terms;
   determining, by the search engine and from session data stored in a repository associated with the search engine, a first set of relevant previous search sessions from a second set of previous search sessions, wherein the second set of previous search sessions includes more previous search sessions than the first set of relevant previous search sessions, wherein each previous search session in the first set of relevant previous search sessions is associated with a respective time label corresponding to the time indicator;
   identifying, by the search engine, a particular previous search session, from among the first set of relevant previous search sessions determined from the session data stored in the repository associated with the search engine, based on the one or more other query terms associated with the search query of the current search session without searching any previous search sessions of the second set of previous search sessions that are not in the first set of relevant previous search sessions;
   identifying, by the search engine, one or more entities that are associated with one or more search queries or search results of the particular previous search session, based on the one or more other query terms of the search query of the current search session; and
   providing (i) a response to the search query that includes a representation of one or more of the entities, from a text-to-speech engine, that is configured to be output on a speaker of the digital assistant device in response to the search query of the current search session and (ii) metadata, from the search engine, related to the one or more entities that is configured to be rendered on a graphical user interface of the digital assistant device during output of at least a portion of the response to the search query using the speaker of the digital assistant device.

2. The method of claim 1, wherein identifying a particular previous search session, from among the first set of relevant previous search sessions comprises:
   determining, for each previous search session of the first set of relevant previous search sessions, a plurality of query terms associated with the one or more search queries or search results of the previous search session;
   determining a score based on comparing the plurality of query terms associated with the one or more search queries or search results of the previous search session with the one or more other query terms of the search query of the current search session; and identifying a particular previous search session, from among the first set of relevant previous search sessions, based on the score.

3. The method of claim 1, wherein the operations further comprise:
before determining that the search query refers to a time indicator, determining that the search query is not associated with a previous query for the current search session.

4. The method of claim 1, wherein the operations further comprise:
determining that the search query refers to a user location indicator, the user location indicator indicating the location of the user during a previous search session; and
determining a plurality of previous search sessions, each previous search session being associated with a respective location label corresponding to the user location indicator.

5. The method of claim 1, wherein determining a first set of relevant previous search sessions from a second set of previous search sessions comprises identifying previous search sessions associated with time labels within a range of times associated with the time indicator.

6. The method of claim 1, wherein the operations further comprise:
before receiving a search query during a current search session, determining a user identifier for a user.

7. The method of claim 6, wherein determining a first set of relevant previous search sessions from a second set of previous search sessions comprises determining a plurality of previous search sessions associated with the user identifier.

8. The method of claim 1, wherein the operations further comprise:
performing an action based on the representation of one or more of the entities in response to the search query of the current search session.

9. The method of claim 8, wherein the action is a navigational action.

10. A system, comprising:
a data processing apparatus; and
a non-transitory computer readable storage medium in data communication with the data processing apparatus and storing instructions executable by the data processing apparatus and upon such execution cause the data processing apparatus to perform operations comprising:
receiving, by a search engine and from a speech-to-text engine, a search query that is based on an utterance of a user that was detected by a digital assistant device during a current search session;
determining, by the search engine, that the search query refers to a time indicator, the time indicator indicating a time earlier than the current search session;
determining, by the search engine, that the search query refers to one or more other query terms;
determining, by the search engine and from session data stored in a repository associated with the search engine, a first set of relevant previous search sessions from a second set of previous search sessions, wherein the second set of previous search sessions includes more previous search sessions than the first set of relevant previous search sessions, wherein each previous search session in the first set of relevant previous search sessions is associated with a respective time label corresponding to the time indicator;
identifying, by the search engine, a particular previous search session, from among the first set of relevant previous search sessions determined from the session data stored in the repository associated with the search engine, based on the one or more other query terms associated with the search query of the current search session without searching any previous search sessions of the second set of previous search sessions that are not in the first set of relevant previous search sessions;
identifying, by the search engine, one or more entities that are associated with one or more search queries or search results of the particular previous search session, based on the one or more other query terms of the search query of the current search session; and
providing (i) a response to the search query that includes a representation of one or more of the entities, from a text-to-speech engine, that is configured to be output on a speaker of the digital assistant device in response to the search query of the current search session and (ii) metadata, from the search engine, related to the one or more entities that is configured to be rendered on a graphical user interface of the digital assistant device during output of at least a portion of the response to the search query using the speaker of the digital assistant device.

11. The system of claim 10, wherein identifying a particular previous search session, from among the first set of relevant previous search sessions comprises:
determining, for each previous search session of the first set of relevant previous search sessions, a plurality of query terms associated with the one or more search queries or search results of the previous search session;
determining a score based on comparing the plurality of query terms associated with the one or more search queries or search results of the previous search session with the one or more other query terms of the search query of the current search session; and
identifying a particular previous search session, from among the first set of relevant previous search sessions, based on the score.

12. The system of claim 10, wherein the operations further comprise:
before determining that the search query refers to a time indicator, determining that the search query is not associated with a previous query for the current search session.

13. The system of claim 10, wherein the operations further comprise:
determining that the search query refers to a user location indicator, the user location indicator indicating the location of the user during a previous search session; and
determining a plurality of previous search sessions, each previous search session being associated with a respective location label corresponding to the user location indicator.

14. The system of claim 10, wherein determining a first set of relevant previous search sessions from a second set of previous search sessions comprises identifying previous search sessions associated with time labels within a range of times associated with the time indicator.

15. The system of claim 10, wherein the operations further comprise:
before receiving a search query during a current search session, determining a user identifier for a user.

16. The system of claim 15, wherein determining a first set of relevant previous search sessions from a second set of previous search sessions comprises determining a plurality of previous search sessions associated with the user identifier.

17. The system of claim 10, wherein the operations further comprise: performing an action based on the representation of one or more of the entities in response to the search query of the current search session.

18. The system of claim 17, wherein the action is a navigational action.

19. A non-transitory computer readable storage medium storing instructions executable by a data processing apparatus and upon such execution cause the data processing apparatus to perform operations comprising:
receiving, by a search engine and from a speech-to-text engine, a search query that is based on an utterance of a user that was detected by a digital assistant device during a current search session;
determining, by the search engine, that the search query refers to a time indicator, the time indicator indicating a time earlier than the current search session;
determining, by the search engine, that the search query refers to one or more other query terms;
determining, by the search engine and from session data stored in a repository associated with the search engine, a first set of relevant previous search sessions from a second set of previous search sessions, wherein the second set of previous search sessions includes more previous search sessions than the first set of relevant previous search sessions, wherein each previous search session in the first set of relevant previous search sessions is associated with a respective time label corresponding to the time indicator;
identifying, by the search engine, a particular previous search session, from among the first set of relevant previous search sessions determined from the session data stored in the repository associated with the search engine, based on the one or more other query terms associated with the search query of the current search session without searching any previous search sessions of the second set of previous search sessions that are not in the first set of relevant previous search sessions;
identifying, by the search engine, one or more entities that are associated with one or more search queries or search results of the particular previous search session, based on the one or more other query terms of the search query of the current search session; and
providing (i) a response to the search query that includes a representation of one or more of the entities, from a text-to-speech engine, that is configured to be output on a speaker of the digital assistant device in response to the search query of the current search session and (ii) metadata, from the search engine, related to the one or more entities that is configured to be rendered on a graphical user interface of the digital assistant device during output of at least a portion of the response to the search query using the speaker of the digital assistant device.

20. The computer readable storage medium of claim 19, wherein identifying a particular previous search session, from among the first set of relevant previous search sessions comprises:
determining, for each previous search session of the first set of relevant previous search sessions, a plurality of query terms associated with the one or more search queries or search results of the previous search session;
determining a score based on comparing the plurality of query terms associated with the one or more search queries or search results of the previous search session with the one or more other query terms of the search query of the current search session; and
identifying a particular previous search session, from among the first set of relevant previous search sessions, based on the score.

21. The computer readable storage medium of claim 19, wherein the operations further comprise:
before determining that the search query refers to a time indicator, determining that the search query is not associated with a previous query for the current search session.

22. The computer readable storage medium of claim 19, wherein the operations further comprise:
determining that the search query refers to a user location indicator, the user location indicator indicating the location of the user during a previous search session; and
determining a plurality of previous search sessions, each previous search session being associated with a respective location label corresponding to the user location indicator.

23. The computer readable storage medium of claim 19, wherein determining a first set of relevant previous search sessions from a second set of previous search sessions comprises identifying previous search sessions associated with time labels within a range of times associated with the time indicator.

24. The computer readable storage medium of claim 19, wherein the operations further comprise:
before receiving a search query during a current search session, determining a user identifier for a user.

25. The computer readable storage medium of claim 24, wherein determining a first set of relevant previous search sessions from a second set of previous search sessions comprises determining a plurality of previous search sessions associated with the user identifier.

26. The computer readable storage medium of claim 19, wherein the operations further comprise:
performing an action based on the representation of one or more of the entities in response to the search query of the current search session.

27. The computer readable storage medium of claim 26, wherein the action is a navigational action.

28. The computer readable storage medium of claim 26, wherein the action is a reminder action.

* * * * *